…

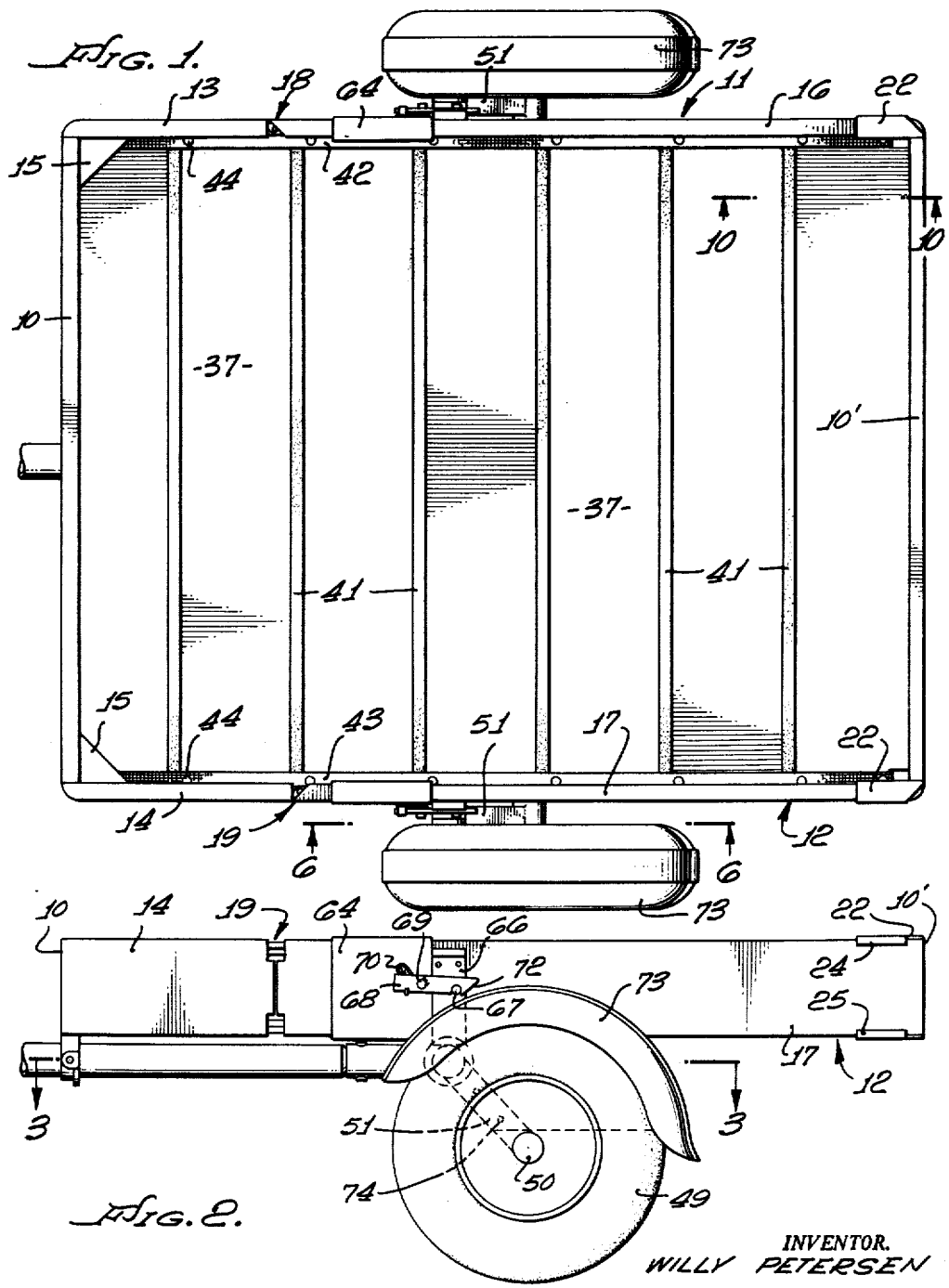

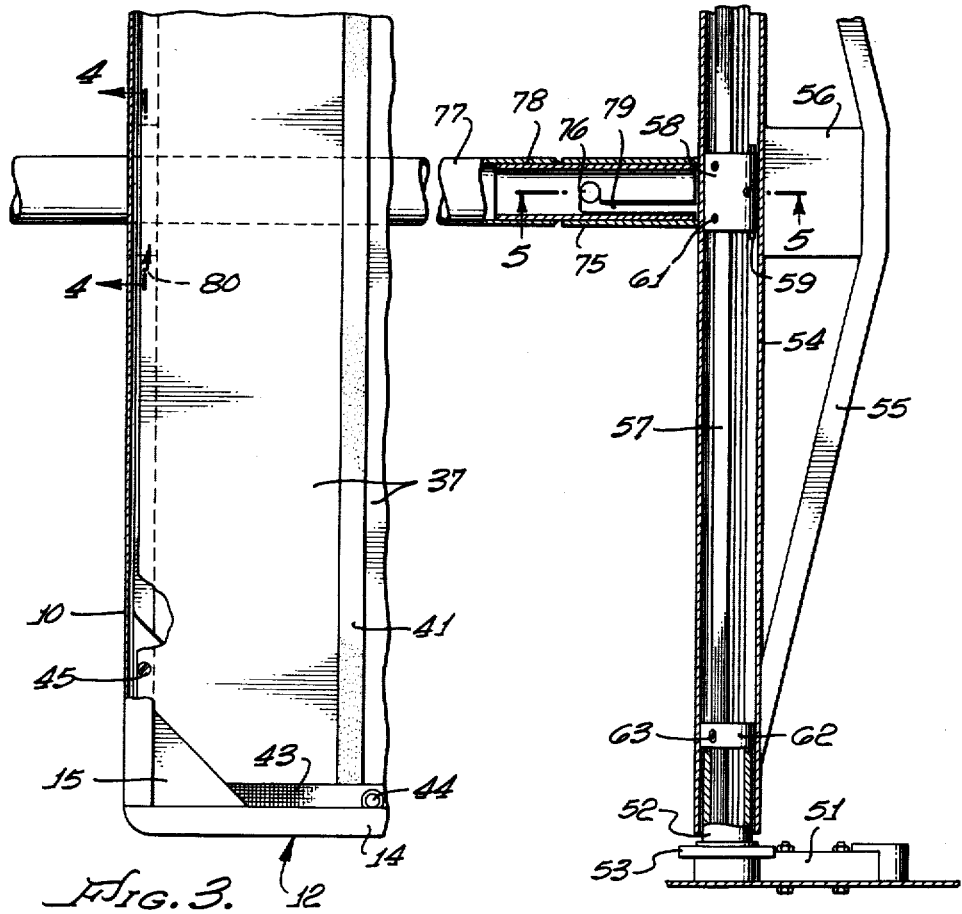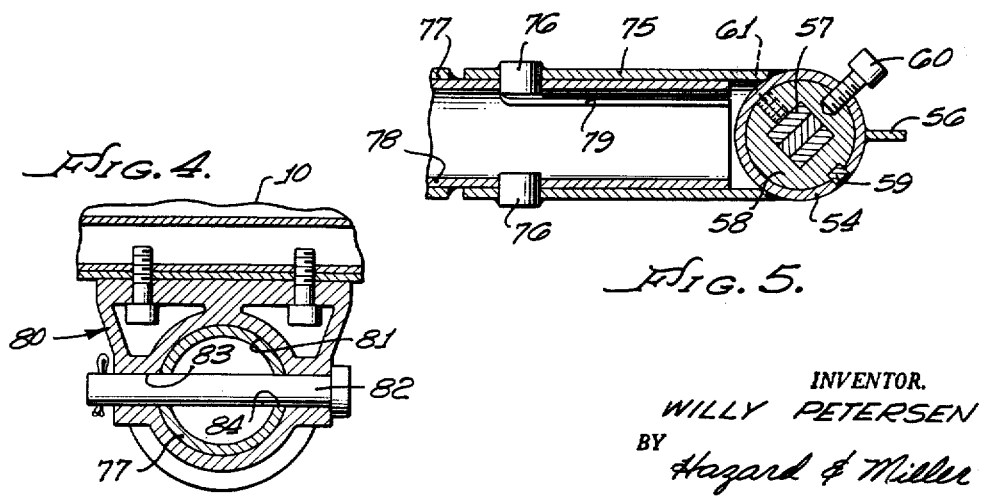

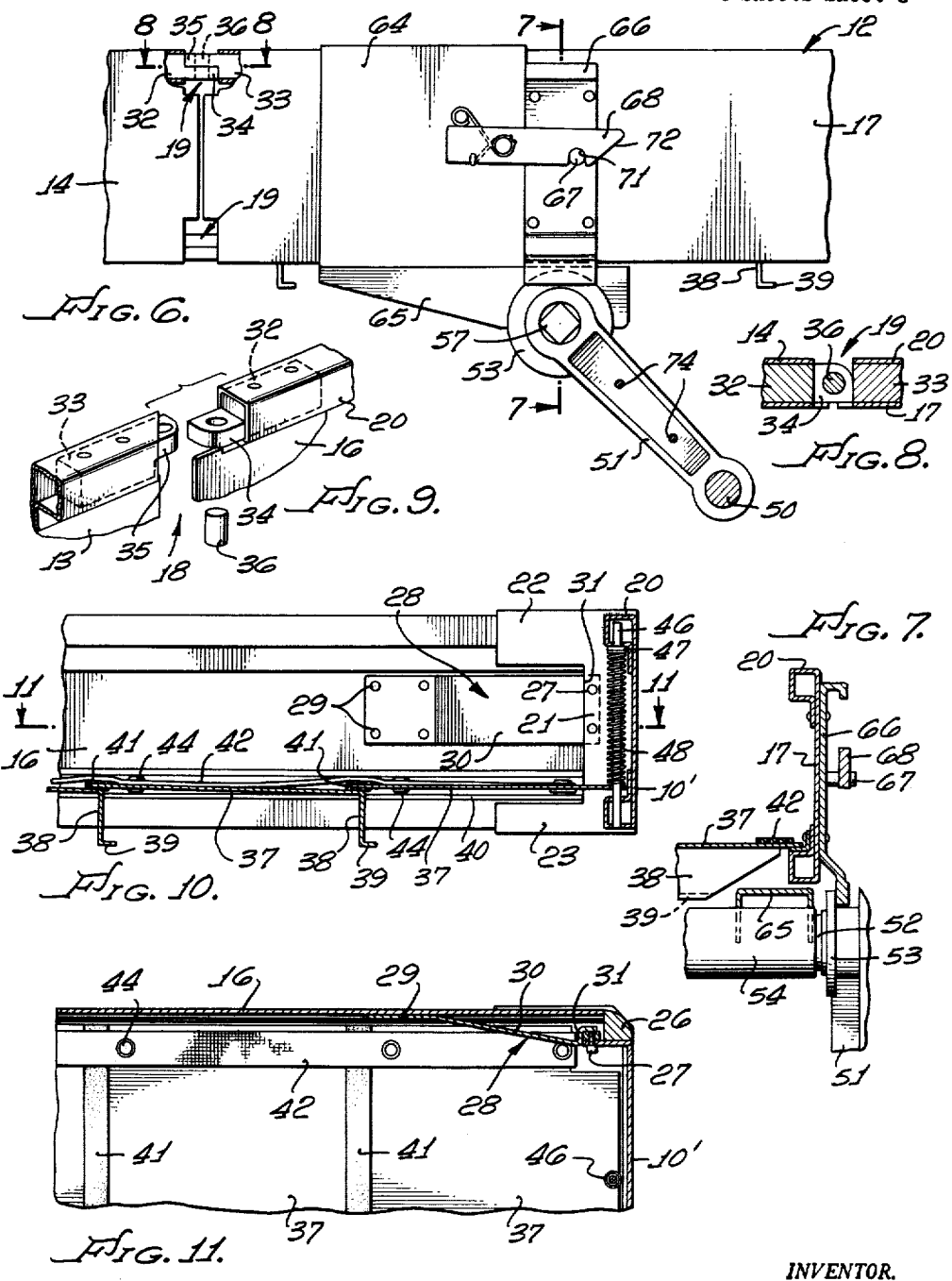

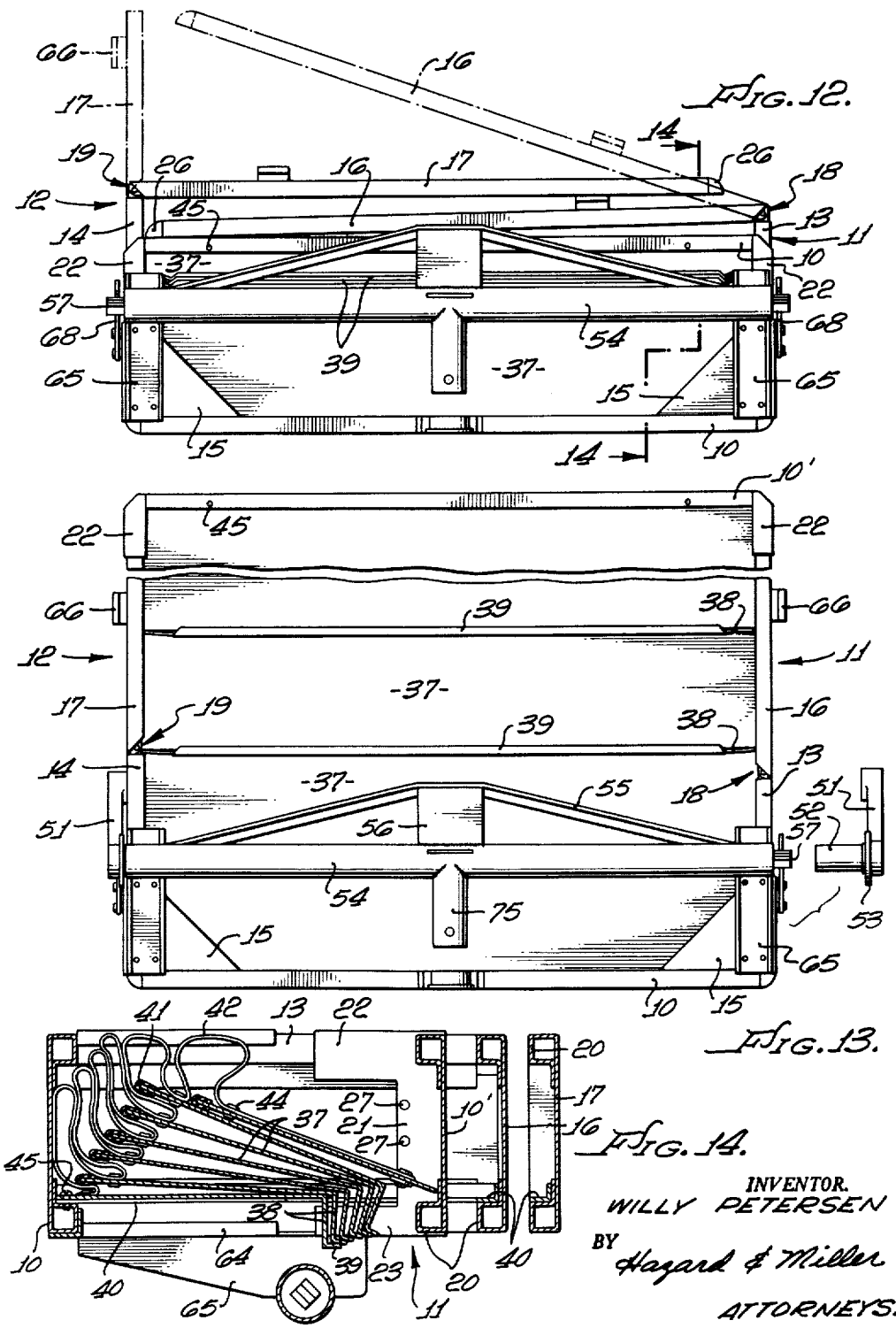

United States Patent Office 3,081,125
Patented Mar. 12, 1963

**3,081,125
FOLDING TRAILERS**
Willy Petersen, Rosenvej, Snekkersten, Denmark
Filed Dec. 7, 1959, Ser. No. 857,744
7 Claims. (Cl. 296—27)

This invention relates to a foldable trailer designed to carry loads that are to be towed behind an automobile or similar vehicle. The application is a continuation-in-part of my copending United States application Serial No. 725,713, filed April 1, 1958, entitled Folding Trailer, and now abandoned.

A primary object of the invention is to provide a foldable trailer adapted to assume an extended position in which position the trailer is normally used or a collapsed position occupying a relatively small space in which position or condition the trailer can be stored when not in use.

More specifically, an object of the invention is to provide a collapsible trailer body consisting of a front wall, side walls and a rear wall, the rear wall being slidable on the side walls toward and away from the front wall, the side walls being formed with inwardly foldable hinged sections which are swingable inwardly one behind the other behind the rear wall when the rear wall is in its forwardmost position.

Another object of the invention is to provide a trailer having the above-mentioned characteristics wherein the floor of the trailer is composed of separate panels connected together by tapes or equivalent flexible devices, the rearmost panel being detachably connected to the rear wall. By means of this construction the panels can assume stacked positions, one on top of the other, immediately behind the front wall when the trailer is collapsed but on extending the trailer from its collapsed condition the panels may be consecutively pulled from the stack by the rear wall as it slides rearwardly between the side walls and assume their respective positions cooperating together to form a completed floor for the trailer.

Another object of the invention is to provide a trailer having the above-mentioned characteristics wherein ground wheels are provided that are detachably mounted on the ends of an axle, the axle being slidably mounted on the side walls so that when the trailer is collapsed the axle may assume a position adjacent the front wall and if desired, the ground wheels can be detached from the axle while in this position in the interest of conserving space when the trailer is collapsed.

Another object of the invention is to provide a trailer in which the axle consists essentially of a tubular housing within which there is anchored centrally thereof a torque rod of novel construction. Cranks are detachably mounted on the ends of the torque rod so as not to be rotatable relatively thereto but which have a rotatable connection with respect to the housing. These cranks have spindles or the equivalent mounted at their outer ends on which the ground wheels are rotatably mounted. By means of this construction the resiliency of the torque rod within the housing provides the adequate spring support that supports the body of the trailer and the load thereon resiliently upon the ground wheels.

Another object of the invention is to provide a novel construction of detachable tongue or hitch for the trailer by which the trailer may be towed by a towing vehicle.

A further object of the invention is to provide a collapsible trailer which can be easily and quickly set up or extended, or in the alternative, collapsed, and which when collapsed, has a minimum number of parts that are detached from the body of the trailer thus reducing the number of parts that may become lost or misplaced because of their detachment from the trailer when the trailer is stored.

With the foregoing and other objects in view, which will be made manifest in the following detailed description and specifically pointed out in the appended claims, reference is had to the accompanying drawings for an illustrative embodiment of the invention, wherein:

FIGURE 1 is a top plan view of the trailer embodying the present invention showing the trailer in its expanded or extended position;

FIG. 2 is a view in side elevation of the same;

FIG. 3 is a partial view in horizontal section taken substantially upon the line 3—3 upon FIG. 2 in the direction indicated;

FIG. 4 is a partial view in vertical section taken substantially upon the line 4—4 upon FIG. 3 in the direction indicated;

FIG. 5 is a partial view in vertical section taken substantially upon the line 5—5 upon FIG. 3 in the direction indicated;

FIG. 6 is a partial view taken substantially upon the line 6—6 upon FIG. 1 in the direction indicated;

FIG. 7 is a partial view in vertical section taken upon the line 7—7 upon FIG. 6;

FIG. 8 is a partial horizontal section taken upon the line 8—8 upon FIG. 6 in the direction indicated, illustrating details of a hinge employed in the side walls of the trailer;

FIG. 9 is a partial exploded view in perspective illustrating details of the hinge;

FIG. 10 is a partial vertical section taken substantially upon the line 10—10 upon FIG. 1 in the direction indicated;

FIG. 11 is a partial horizontal section taken upon the line 11—11 on FIG. 10;

FIG. 12 is a view in elevation taken of the under side of the body of the trailer when the trailer is in collapsed condition;

FIG. 13 is a view similar to FIG. 12, but illustrating the body of the trailer as having been partially expanded or extended; and FIG. 14 is a sectional view taken substantially upon the line 14—14 upon FIG. 12.

Referring to the accompanying drawings wherein similar reference characters designate similar parts throughout, the improved trailer consists of a body comprising a front wall 10, opposed side walls generally indicated at 11 and 12, and a rear wall 10'. The side walls 11 and 12 have portions 13 and 14, respectively, which are rigidly attached to the ends of the front wall 10. Corner gussets 15 which are rigidly attached to the front wall 10 and to the portions 13 and 14 may form part of the rigid connection. The rear portions of the side walls 11 and 12 indicated respectively at 16 and 17, are hingedly connected to the forward portions of the side walls by hinges 18 and 19, respectively.

As will be observed from an inspection of FIG. 1, hinge 18 is located somewhat forwardly of the hinge 19. This relationship enables the portion 16 of side wall 11 to be swung inwardly on its hinges 18 behind the back wall 10' when the back wall 10' has moved to its forwardmost collapsed position as shown in FIG. 12, and then have the portion 17 of side wall 12 swung inwardly therebehind.

As indicated from an inspection of FIGS. 7, 9, and 14, the side walls are preferably formed of sheet metal, the tops and bottoms of which are bent to form closed stiffening and strengthening structures indicated at 20 extending longitudinally thereof which materially stiffen and strengthen the walls. These strengthening structures, in effect, provide rails at the tops and bottoms of the side walls on which the ends of the rear wall 10' are slidable. These ends, one of which is illustrated on FIG. 14, consist of forwardly extending portions 21 which may or may not be integral with the body portion of the rear wall 13 and have top and bottom portions 22 and 23, respectively, which extend forwardly from the portions 21 and have their top and bottom edges, respectively, bent outwardly over the tops of the strengthening portions 20 of the side walls 11 and 12 and downwardly and upwardly over the outer sides of the side walls as indicated by the portions 24 and 25 on FIG. 2. By means of this construction the rear wall 10′ is slidably mounted on the portions 16 and 17 of the side walls 11 and 12 and the ends are capable of passing over the hinges 18 and 19 and to even slide onto the portions 13 and 14 of the side walls as indicated on FIG. 12.

At the rear ends of the portions 16 and 17 of the side walls 11 and 12 there are secured upright terminal members 26 which are arranged in the path of stops 27 secured to the outer sides of the portions 21 of the ends of the rear wall 10′, see FIG. 11. These terminal members, when engaged by the stops, limit rearward movement of the rear wall 10′ as it slides rearwardly on the opposed sides 11 and 12. Each side 11 and 12 has secured thereto adjacent its rear end a shouldered spring catch 28 which is secured to the side wall at 29 and presents an inclined camming surface 30 in the path of the stop 27. At the end of the camming surface there is a shoulder 31 that is engageable with the stop. As the rear wall 10′ moves rearwardly between the side walls 11 and 12 the stop 27 at each end of the rear wall engages the camming portion 30 springing the catch outwardly until the stop has passed over the shoulder 31. When this occurs the resiliency of the spring catch causes it to return to the position shown in FIG. 11, thus locking the rear wall in its rearmost position. Whenever it is desired to move the rear wall forwardly in the course of collapsing the trailer the spring catches 28 are manually pressed outwardly to cause the shoulder 31 to clear the stop 27 and thus enable the rear wall to be slid forwardly on the two side walls.

The hinges between the portions of the side walls are preferably constructed as illustrated in FIGS. 6, 8, and 9 and consist merely of blocks 32 and 33 which fit within the strengthening or rail portions 20 of the portions of the side walls. These blocks are riveted or otherwise secured in position and have opposed registrable ears 34 and 35 adapted to receive a hinge pin 36. As these hinges are disposed entirely within the contours of the rail portions 20 they in no way interfere with the sliding of the ends of the rear wall 10′ thereover in moving from the extended position shown in FIG. 1 to the collapsed position shown in FIG. 12.

A floor for the body of the trailer is provided consisting of a plurality of metal panels 37. These panels may be identical with each other in construction and each preferably has its rear edge bent downwardly as indicated at 38, and then rearwardly as indicated at 39 for stiffening purposes. The portions 38 and 39 preferably terminate short of the extreme ends of the panels, see FIG. 13, and the extreme end portions of the panels are slidable on the lower rail portions of the side walls 11 and 12. If desired, these portions may be protected by angle irons 40, see FIG. 14.

The forward edges of the panels are preferably enclosed by U-shaped rubber gaskets 41 extending the complete length thereof and these gaskets lie upon the trailing edge of the next forward panel when the floor is extended, see FIG. 10.

The panels 37 are connected to each other by means of flexible members such as heavy fabric tapes 42 and 43 which extend from front to back of the body and which are riveted or otherwise secured near the forward edge of each panel, such as by rivets 44. Except for being connected to the panels at these points, the tapes are unsecured to the panels so that the tapes may fold relatively thereto when the floor is collapsed as illustrated in FIG. 14.

The forwardmost floor panel is permanently secured to the front wall such as by screws 45 and the rearmost panel is detachably connected to the rear wall such as by spring actuated latch pins 46. These latch pins have washers or shoulders 47 which are urged upwardly by coil compression springs 48. They extend into the upper and lower strengthening or rail-forming portions 20 on the rear wall 13 that can be removed to detach the rear panel from the rear wall by pressing the latch pins downwardly compressing the coil springs 48 and then tilting the latch pins forwardly so as to clear the upper strengthening or rail forming portion 20 on the rear wall. The holes in the lower rail forming portion are sufficiently loose to permit of this tilting movement.

Normally, the latch pins 46 connect the rear panel to the rear wall and when the rear panel is thus connected, on moving the rear wall from its collapsed position shown in FIG. 12 to the extended position shown in FIG. 1, the rear panel of the floor which is thus releasably attached to the rear wall draws the tapes 42 and 43 rearwardly causing the panels to be consecutively drawn from their stacked positions shown in FIG. 14 into their extended positions shown in FIG. 1. In the latter position the panels overlap each other sliding at their forward edges as illustrated in FIG. 10, and cooperate to form a floor in the trailer. Detachment of the rearmost panel from the rear wall is desirable so that the rear panel and panels immediately preceding it may be moved forwardly from their fully extended positions in unloading finely divided materials, such as dirt, sand, rock and the like which can be pushed through the opening left in the rear of the floor by the forwardly advanced panels without involving lifting of such material out of the box-like structure that forms the body of the trailer.

The body of the trailer is supported by ground wheels 49. These ground wheels are rotatably mounted on spindles 50 which are mounted on the swinging ends of cranks 51, see FIG. 6. The cranks 51 are provided with hub portions 52 which are flanged as at 53. An axle is provided for these ground wheels which consists of a tubular housing 54 that extends from side to side beneath the body of the trailer. This housing may be strengthened or braced by means of a tie rod 55 and a strut 56. Within the tubular housing 54 there is a torque rod 57 that extends from end to end thereof and through a central bushing 58 that is anchored at the center of the housing. This bushing is held against rotation in the housing by means of a key 59 and set screw 60. The torque rod is preferably laminated and is illustrated as being composed of three identical sections of spring steel which mutually cooperate to form a torque rod that is rectangular in cross-section, see FIG. 5. This torque rod is anchored centrally in the bushing 58 by set screws 61. Adjacent the outer ends of the torque rod there are collars 62 which rotatably fit the interior of the housing 54. These collars may be anchored in position such as by set screws 63.

The hubs 52 on the cranks 51 have squared interiors which receive the squared ends of the torque rod 57, thus forming a non-rotatable connection between the torque rod and each crank. The hubs 52 are of a size capable of telescoping within the housing 54 so that these hubs may be regarded as having a rotatable connection with the housing. The torque rod thus forms a resilient support between the ground wheels 49 and the body of the trailer in that whenever a ground wheel encounters a bump causing a crank 51 to be urged to swing upwardly about the axis of the housing 54 as a center, this upward movement is yieldably and resiliently permitted by the torque rod. That portion of the torque rod 57 that is between the bushing 58 and the crank 51 that is urged upwardly merely twists within the housing 54 and such twisting as well as the return of the torque rod to its initial position is somewhat facilitated by virtue of the face that the torque rod is made up of spring steel laminations.

It is desirable to have the axle thus formed by the tubular housing 54 and its contained parts movable from the extended position shown in FIG. 2 to a collapsed position illustrated in FIG. 12 adjacent the front wall when the trailer is collapsed wherein it is disposed wholly beneath the rigidly attached portions 13 and 14 of the side walls. To this end slides 64 are provided on each side wall 11 and 12. These slides are located on the outer sides of the side walls and are hooked inwardly at their top and bottom over the strengthening or rail forming portions 20. At their lower ends the slides are provided with inverted U-shaped structures 65 which extend rearwardly from the slides and which are welded or otherwise secured to the top of the housing 54. Forward movement of the slides 64 relative to the side walls is limited by the engagement of the hooked portions with the gussets 15. Rearward movement of the slides 64 is limited by brackets 66 which are riveted or otherwise secured to the portions 16 and 17 of the side walls 11 and 12. These brackets have outwardly extending pins 67 thereon which are engageable by latches 68 that are pivotally mounted on the slide 64 on pivot pins 69. Springs 70 mounted on the slides 64 urge the swinging ends of the latches downwardly. These latches have recesses 71 on their lower edges adapted to receive the pins 67 and the rear edge of each latch is beveled as at 72 to provide a cam face. Thus, as the slides 64 are caused to slide rearwardly in relation to the side walls 11 and 12 the cam surfaces 72 on engagement with the pins 67 will lift the latches until they can drop onto the pins 67, thus locking the slides 64 in their rearmost positions in engagement with the brackets 66. During the rearward movement of the slides and their attached housing 54, the flanges 53 on the bushings 52 of cranks 51 enter behind the lower ends of the brackets as illustrated in FIG. 7, thus locking the cranks 51 against withdrawal from the ends of the bushing 54 whenever the slides are locked in their rearmost positions against the brackets. However, whenever the slides 64 are moved forwardly the flanges 53 are moved from behind the brackets and the cranks under these circumstances are free to be withdrawn from the ends of the housing 54. In withdrawing the cranks 51 from the ends of the housing the ground wheels of course may be allowed to remain attached thereto and the sole purpose of withdrawing the ground wheels and their associated cranks is to detach the ground wheels from the collapsed body of the trailer to facilitate storage of the trailer in a relatively small space.

The finders or mudguards 73 for the ground wheels 49 can be riveted or otherwise attached to the cranks 51 such as by rivets 74.

On the forward side of the housing 54 there is welded or otherwise secured a tubular socket 75. This socket has opposed pins 76 welded therein that extend inwardly. A tubular tongue 77 is provided which has a reduced extension 78 secured thereto that is telescopically receivable in the socket 75. This reduced end is equipped with bayonet slots 79 that are adapted to receive the inner ends of pins 76. Beneath the forward wall 10 there is secured a fitting 80 having an aperture 81 through which the tongue 77 is slidable. This fitting is designed to receive a pin 82 through transversely aligned apertures 83. There are transversely aligned apertures 84 formed in the tongue which are registrable with the apertures 83 only when the pins 76 occupy positions in the ends of the bayonet slots 79 as illustrated in FIG. 3. Thus, when the tongue is inserted in the socket 75, turned to lock the bayonet joint, the pin 82 may be inserted in the apertures 83 and 84 to lock the tongue against reverse rotation. This forms a very sturdy, but nevertheless, detachable connection between the tongue and the housing 54 of the axle. However, whenever the trailer is collapsed, pin 82 may be withdrawn and the tongue 77 detached from the collapsed body of the trailer leaving the collapsed body in the condition as illustrated in FIG. 12.

From the above-described construction it will be appreciated that an improved collapsible trailer is provided which can be easily and quickly set up or extended or, in the alternative, collapsed. Usually, in extending the trailer the collapsed body of the trailer is positioned with its forward wall 10 downwardly on the ground or other supporting surface. The portions 16 and 17 of the side walls can be swung outwardly into alignment with portions 13 and 14, respectively, and the back wall can then be pulled upwardly. In the course of pulling the back wall upwardly the panels 37 of the bottom are consecutively removed from the stack and assume their positions between the side walls. The back wall is locked in its rearwardmost position by the spring latches 28. The cranks 51 can then be applied to the ends of the housing 54 and caused to non-rotatably engage the ends of the torque rod 57. The slides 64 can then be caused to slide relative to the side walls 11 and 12 until their latches 68 lockingly engage the pins 67 on the brackets 66. When in this position the engagement of the flanges 53 behind the brackets prevents withdrawal of the cranks from the ends of the housing. The trailer can then be righted so that the body is supported on the ground wheels and the tongue 77 can be applied to the socket 75 and locked in place by the pin 82. The forward end of the tongue may be equipped with any suitable or conventional trailer hitch by which it may be attached to a towing vehicle.

It will be appreciated from the above described construction that although the body of the trailer is collapsible into a relatively small space volumetrically that nevertheless most of the portions of the body remain permanently attached to each other, thus avoiding loss or misplacement during storage. The only parts that are removable are the cranks 51 with their associated ground wheels, the tongue 77 and the locking pin 82 which can be conveniently stored near the collapsed trailer. Even these parts are not necessarily removed from the trailer when it is collapsed.

Various changes may be made in the details of construction without departing from the spirit and scope of the invention as defined by the appended claims.

I claim:

1. A foldable trailer having a front wall, side walls extending rearwardly therefrom and a rear wall, means slidably mounting said rear wall on the side walls for adapting said rear wall to assume a collapsed position adjacent the front wall or a position remote therefrom, said side walls being formed of hinged sections foldable inwardly one over the other when the rear wall is in collapsed position, and a plurality of floor panels, means slidably mounting said floor panels slidable at their ends on the side walls, said floor panels being stacked one on top of the other between the front and rear walls when the rear wall is in collapsed position, and being consecutively movable rearwardly when extended to form a complete bottom between the front, rear and side walls.

2. A foldable trailer having a front wall, side walls extending rearwardly therefrom and a rear wall, means slidably mounting said rear wall on the side walls for adapting said rear wall to assume a collapsed position adjacent the front wall or a position remote therefrom, said side walls being formed of hinged sections foldable inwardly one over the other when the rear wall is in collapsed position, a plurality of floor panels, means slidably mounting said floor panels slidable at their ends on the side walls, said floor panels being stacked one on top of the other between the front and rear walls when the rear wall is in collapsed position, and flexible means connected to each floor panel and running from front to back of the trailer, said flexible means allowing the floor panels to be stacked or to be moved into extended positions by pulling the rearmost floor panel rearwardly to form a complete bottom between the front, rear and side walls.

3. A foldable trailer having a front wall, side walls extending rearwardly therefrom and a rear wall, means slidably mounting said rear wall on the side walls for adapting said rear wall to assume a collapsed position adjacent the front wall or a position remote therefrom, said side walls being formed of hinged sections foldable inwardly one over the other when the rear wall is in collapsed position, a plurality of floor panels, means slidably mounting said floor panels slidable at their ends on the side walls, said floor panels being stacked one on top of the other between the front and rear walls when the rear wall is in collapsed position, means connecting the rearmost floor panel to the rear wall so that it may be moved rearwardly thereby, flexible means connecting the floor panels so that they may be moved from their stacked positions to extended positions to form a complete bottom between the front, rear and side walls by moving the rear wall rearwardly relative to the side walls, and means for locking the rear wall against forward movement relative to the side walls when the rear wall is in its rearmost position.

4. A foldable trailer having a front wall, inwardly collapsible side walls having portions rigidly attached to the front wall and swingable portions hingedly connected thereto, and a rear wall, means mounting said rear wall on the side walls for movement toward and away from the front wall on the side walls, means for locking the rear wall on the side walls remote from the front wall, a floor between the side walls, brackets on the swingable portions of the side walls intermediate the ends thereof, an axle having ground wheels, slidable means mounting the axle for sliding movement on the side walls forwardly of said brackets, means for locking the slidable means to the brackets, said axle having flange portions engageable with the brackets when the slidable means is locked to the brackets.

5. In a portable trailer having a collapsible body with brackets secured to the side thereof, an axle housing beneath the body, slidable means slidably mounting the axle housing on the sides of the body forwardly of the brackets and means for releasably locking the slidable means to the brackets; a torque rod assembly comprising a torque rod centrally anchored in the housing, cranks non-rotatably engageable with the ends of the torque rod and rotatably engageable with the ends of the housing, ground wheels rotatably mounted on the ends of the cranks, and flanges on the cranks engageable with the inner sides of the brackets when the slidable means is locked to the brackets.

6. In a foldable trailer, a body having a front wall, inwardly collapsible side walls and a rear wall, means slidably mounting said rear wall on the side walls, a plurality of overlapping floor panels, means slidably mounting said floor panels at their ends on the side walls, and flexible means connecting the panels to each other, the rearmost panel being connected to the rear wall whereby as the rear wall is slid rearwardly on the side walls the panels will be consecutively drawn rearwardly by the flexible means and caused to assume expanded positions between the side walls.

7. In a foldable trailer, a body having a front wall, inwardly collapsible side walls and a rear wall, means slidably mounting said rear wall on the side walls, a plurality of floor panels, means slidably mounting said floor panels at their ends on the side walls, and flexible means connecting the panels to each other, the rearmost panel being releasably connected to the rear wall whereby as the rear wall is slid rearwardly on the side walls the panels will be consecutively drawn rearwardly by the flexible means and caused to assume expanded positions between the side walls.

References Cited in the file of this patent

UNITED STATES PATENTS

| | | |
|---|---|---|
| 1,396,549 | Beatty | Nov. 8, 1921 |
| 2,080,709 | Hall et al. | May 18, 1937 |
| 2,297,465 | Froehlich | Sept. 29, 1942 |
| 2,387,093 | Schmied | Oct. 16, 1945 |
| 2,497,072 | Cooper | Feb. 14, 1950 |
| 2,720,413 | Halverson | Oct. 11, 1955 |
| 2,743,118 | Dotson | Apr. 24, 1956 |
| 2,786,670 | Hammond | Mar. 26, 1957 |

FOREIGN PATENTS

| | | |
|---|---|---|
| 76,339 | Austria | May 10, 1919 |
| 1,199,966 | France | June 22, 1959 |
| (Corresponding British Patent 828,582, Feb. 17. 1960) | | |
| 947,675 | Germany | Aug. 23, 1956 |
| 332,692 | Switzerland | Oct. 31, 1958 |

UNITED STATES PATENT OFFICE
CERTIFICATE OF CORRECTION

Patent No. 3,081,125                     March 12, 1963

Willy Petersen

It is hereby certified that error appears in the above numbered patent requiring correction and that the said Letters Patent should read as corrected below.

In the grant, lines 1 to 3, for "Willy Petersen, of Rosenvej, Snekkersten, Denmark," read -- Willy Petersen, of Rosenvej, Snekkersten, Denmark, assignor to Russ Ballard, of Salt Lake City, Utah, --; line 12, for "Willy Petersen, his heirs" read -- Russ Ballard, his heirs --; in the heading to the printed specification, line 3, for "Willy Petersen, Rosenvej, Snekkersten, Denmark" read -- Willy Petersen, Rosenvej, Snekkersten, Denmark, assignor to Russ Ballard, Salt Lake City, Utah --.

Signed and sealed this 20th day of August 1963.

(SEAL)
Attest:

ERNEST W. SWIDER                     DAVID L. LADD
Attesting Officer                     Commissioner of Patents